United States Patent [19]
Kitamura et al.

[11] Patent Number: 5,622,049
[45] Date of Patent: Apr. 22, 1997

[54] CONTROL SYSTEM WITH FUNCTION OF PROTECTING CATALYTIC CONVERTER FOR INTERNAL COMBUSTION ENGINES FOR AUTOMOTIVE VEHICLES

[75] Inventors: Toru Kitamura; Kazutomo Sawamura; Shigetaka Kuroda; Akira Katoh, all of Wako, Japan

[73] Assignee: Honda Giken Kogyo Kabushiki Kaisha, Tokyo, Japan

[21] Appl. No.: 571,472

[22] Filed: Dec. 13, 1995

[30]   Foreign Application Priority Data

Dec. 14, 1994   [JP]   Japan ................................. 6-333178

[51] Int. Cl.$^6$ ...................................................... F01N 3/00
[52] U.S. Cl. ................................................................ 60/285
[58] Field of Search ...................................................... 60/285

[56]   References Cited

U.S. PATENT DOCUMENTS

| | | | |
|---|---|---|---|
| 5,343,700 | 9/1994 | Fujimoto et al. | 60/285 |
| 5,398,501 | 3/1995 | Ito et al. | 60/285 |
| 5,417,060 | 5/1995 | Ishida et al. | 60/285 |
| 5,473,887 | 12/1995 | Takeshima et al. | 60/285 |
| 5,473,889 | 12/1995 | Ehard et al. | 60/285 |
| 5,491,975 | 2/1996 | Yamashita et al. | 60/285 |
| 5,501,073 | 3/1996 | Miyashita et al. | 60/285 |
| 5,537,817 | 7/1996 | Akazaki et al. | 60/285 |
| 5,544,482 | 8/1996 | Matsumoto et al. | 60/277 |

FOREIGN PATENT DOCUMENTS 53-40128   4/1978   Japan .

*Primary Examiner*—John T. Kwon
*Attorney, Agent, or Firm*—Nikaido, Marmelstein, Murray & Oram LLP

[57]   ABSTRACT

A control system for an internal combustion engine for an automotive vehicle determines whether a catalytic converter arranged in the exhaust system of the engine is in a predetermined high temperature condition. When it is determined that the catalytic converter is in the predetermined high temperature condition, priority is given either to a decrease in the amount of intake air supplied to the engine or to an increase in the amount of fuel to be supplied to the engine, depending on operating conditions of the engine.

14 Claims, 8 Drawing Sheets

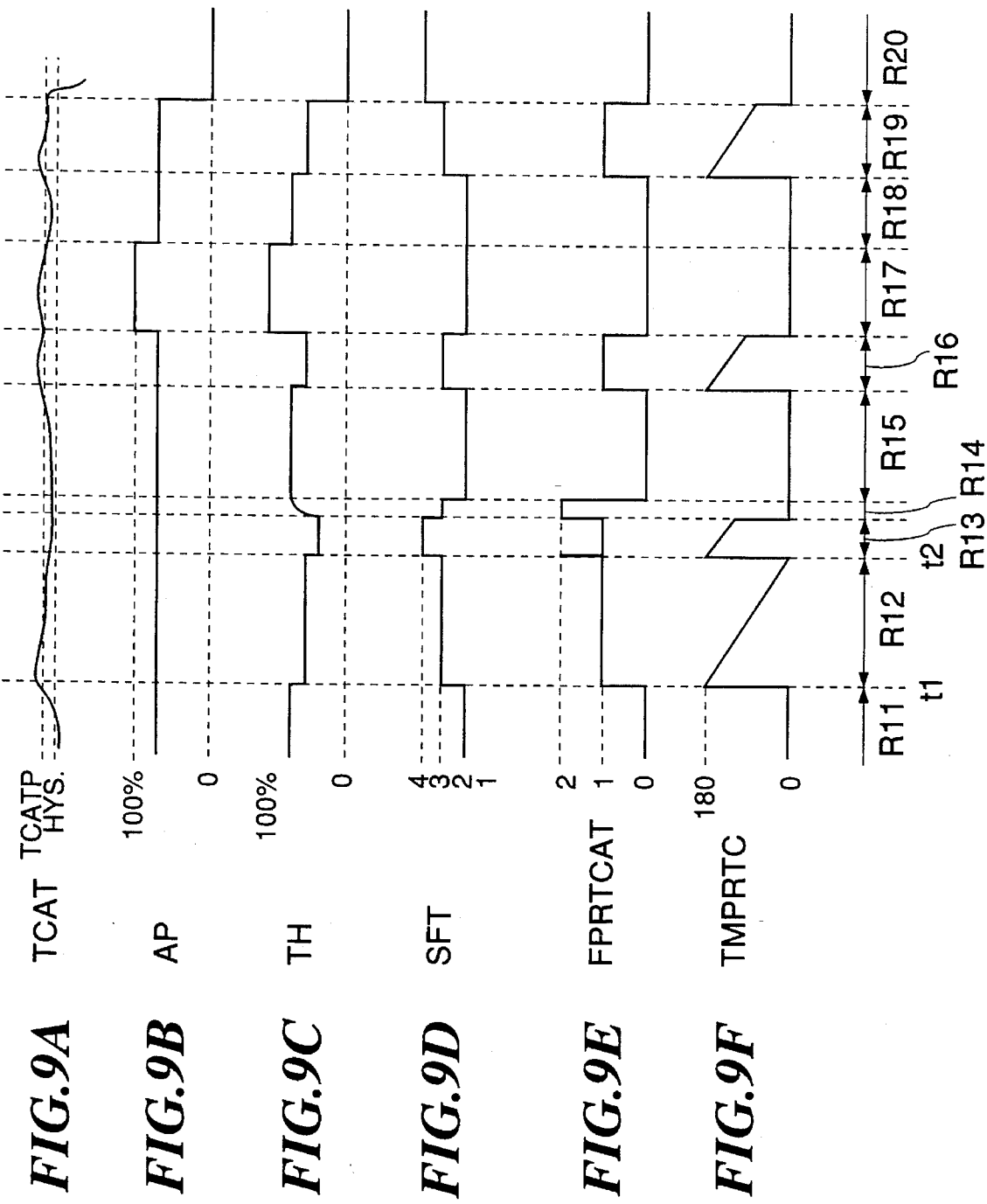

CONTROL SYSTEM WITH FUNCTION OF PROTECTING CATALYTIC CONVERTER FOR INTERNAL COMBUSTION ENGINES FOR AUTOMOTIVE VEHICLES

BACKGROUND OF THE INVENTION

1. Field of the Invention

This invention relates to a control system for internal combustion engines for automotive vehicles, which incorporates a DBW (Drive By Wire) system for electrically controlling the opening of a throttle valve of the engine in response to a stepping amount of an accelerator pedal of the vehicle.

2. Prior Art

Conventionally, a control system for internal combustion engines for automotive vehicles has been proposed by Japanese Laid-Open Patent Publication (Kokai) No. 53-40128, which is intended to prevent deterioration of a catalytic converter of the engine during the operation of the engine in a high-speed and high-load condition, and controls the air-fuel ratio of a mixture supplied to the engine to a richer value than a stoichiometric air-fuel ratio to effect so-called fuel injection cooling, thereby controlling the temperature of the catalytic converter to a value lower than a predetermined value when the engine is operating under such a high-speed and high-load condition.

However, according to this technique, the air-fuel ratio of the mixture deviates toward a richer side of the stoichiometric air-fuel ratio, so that the purifying efficiency of the catalytic converter can be lowered, causing increased emission of noxious components of exhaust gases.

Further, the fuel supply amount is increased, which results in an increase in the fuel consumption.

SUMMARY OF THE INVENTION

It is an object of the invention to provide a control system for internal combustion engines for automotive vehicles, which is capable of preventing increased emission of noxious components of exhaust gases as well as increased fuel consumption, while preventing deterioration of a catalytic converter of the engine.

To attain the above object, the present invention provides a control system for an internal combustion engine for an automotive vehicle, the engine having an intake system, intake air amount-regulating means associated with the intake system for regulating an amount of intake air to be supplied to the engine, an exhaust system, and a catalytic converter arranged in the exhaust system.

The control system according to the invention is characterized by comprising:

temperature-determining means for determining whether the catalytic converter is in a predetermined high temperature condition;

intake air amount control means for controlling the intake air amount-regulating means to decrease the amount of intake air when it is determined by the temperature-determining means that the catalytic converter is in the predetermined high temperature condition;

fuel amount-increasing means for increasing an amount of fuel to be supplied to the engine when it is determined by the temperature-determining means that the catalytic converter is in the predetermined high temperature condition; and priority-determining means for giving priority to one of the intake air amount control means and the fuel amount-increasing means, depending on operating conditions of the engine.

Preferably, the automotive vehicle has an accelerator pedal, the intake air amount-regulating means comprising a throttle valve, the engine having electric driving means for electrically driving the throttle valve in response to a position of the accelerator pedal, the intake air amount control means comprising throttle valve control means for controlling the electric driving means to decrease an opening of the throttle valve when it is determined that the catalytic converter is in the predetermined high temperature condition.

Preferably, the automotive vehicle includes an automatic transmission, the control system including transmission control means for reducing a reduction gear ratio of the automatic transmission when the intake air amount control means controls the intake air amount-regulating means to decrease the amount of intake air.

More preferably, the automotive vehicle includes an automatic transmission, the control system including transmission control means for reducing a reduction gear ratio of the automatic transmission when the throttle valve control means controls the electric driving means to decrease the opening of the throttle valve.

Preferably, the temperature-determining means detects temperature of the catalytic converter and determines that the catalytic converter is in the predetermined high temperature condition when the detected temperature of the catalytic temperature is higher than a predetermined value.

Preferably, the temperature-determining means determines that the catalytic converter is in the predetermined high temperature condition when the engine has continued to be in an operating condition in which rotational speed of the engine exceeds a predetermined value and at the same time load on the engine exceeds a predetermined value, over a predetermined time period.

Preferably, the priority-determining means gives priority to the fuel amount-increasing means over the intake air amount control means when the engine is in a predetermined accelerating condition.

More preferably, the priority-determining means gives priority to the fuel amount-increasing means over the throttle valve control means when a stepping amount of the accelerator pedal is larger than a predetermined amount.

Further preferably, the priority-determining means gives priority to the fuel amount-increasing means over the throttle valve control means when an amount of change in the stepping amount of the accelerator pedal is larger than a predetermined value and at the same time the stepping amount of the accelerator pedal is larger than the predetermined amount.

Preferably, the throttle valve control means controls the electric driving means to progressively decrease the opening of the throttle valve when it is determined that the catalytic converter is in the predetermined high temperature condition.

More preferably, the throttle valve control means controls the electric driving means to progressively decrease the opening of the throttle valve at a rate dependent on rotational speed of the engine.

Preferably, the transmission control means includes inhibiting means for inhibiting the transmission control means from further reducing the reduction gear ratio of the automatic transmission, over a predetermined time period after the transmission control means reduced the reduction gear ratio of the automatic transmission.

Preferably, the transmission control means reduces the reduction gear ratio of the automatic transmission by setting a desired opening of the throttle valve according to traveling speed of the automotive vehicle.

More preferably, the throttle valve control means controls the throttle valve such that the opening of the throttle valve is progressively increased to a value corresponding to a stepping amount of the accelerator pedal, when it is determined that the catalytic converter is no longer in the predetermined high temperature condition after the throttle valve opening has been reduced.

The above and other objects, features, and advantages of the invention will become more apparent from the following detailed description taken in conjunction with the accompanying drawings.

BRIEF DESCRIPTION OF THE DRAWINGS

FIGS. 3A to 3D collectively form a timing chart in which:

FIG. 3A shows changes in a catalyst temperature TCAT;

FIG. 3B shows changes in an accelerator pedal position AP;

FIG. 3C shows changes in a throttle valve opening TH; and

FIG. 3D shows changes in a protection flag FPRTCAT;

FIGS. 9A to 9F collectively form a timing chart in which:

FIG. 9A shows changes in the catalyst temperature TCAT;

FIG. 9B shows changes in the accelerator pedal position AP;

FIG. 9C shows changes in the throttle valve opening TH;

FIG. 9D shows changes in the protection flag FPRTCAT;

FIG. 9E shows changes in a gear shift position SFT; and

FIG. 9F shows changes in a shiftup-inhibiting timer TMPRTC; and

DETAILED DESCRIPTION

The invention will now be described in detail with reference to the drawings showing embodiments thereof.

Figure 1:
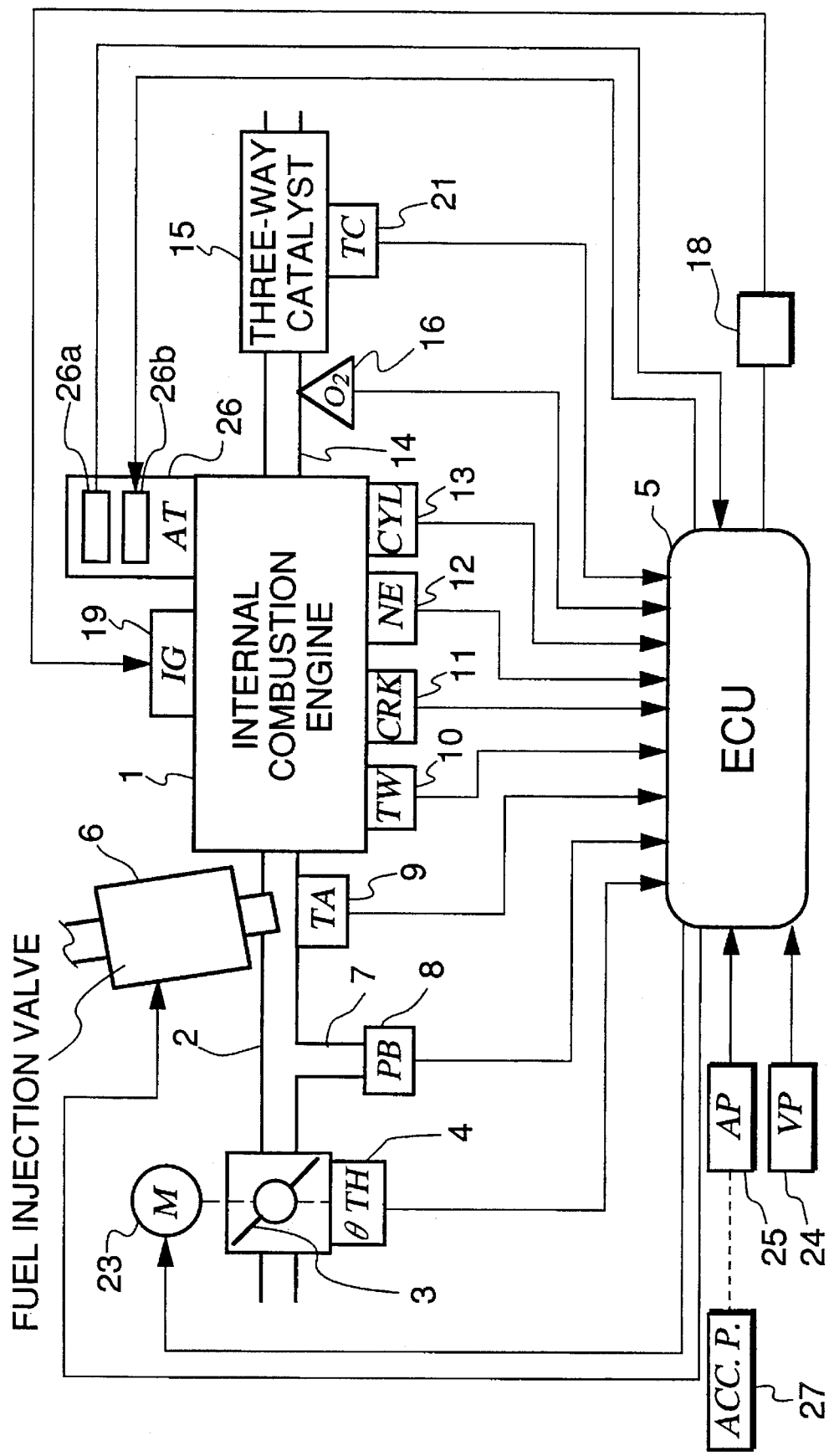
FIG. 1 is a diagram showing the whole arrangement of an internal combustion engine and a control system therefor according to a first embodiment of the invention.

Referring first to FIG. 1, there is shown the whole arrangement of an internal combustion engine (hereinafter simply referred to as "the engine") and a control system therefor according to a first embodiment of the invention. In the figure, reference numeral 1 designates an internal combustion engine for automotive vehicles. Connected to the cylinder block of the engine 1 is an intake pipe 2 in which is arranged a throttle valve 3. A throttle valve opening (TH) sensor 4 is connected to the throttle valve 3 for generating an electric signal indicative of the sensed throttle valve opening TH and supplying the same to an electronic control unit (hereinafter referred to as "the ECU") 5.

The engine 1 employs the DBW system. Connected to the ECU 5 are a throttle actuator 23 for electrically driving the throttle valve 23 and an accelerator pedal position (AP) sensor 25 for detecting the position of an accelerator pedal 27, and the ECU 5 controls the operation of the throttle actuator 23 in response to the accelerator pedal position AP detected by the accelerator pedal position sensor 25.

Fuel injection valves 6, only one of which is shown, are inserted into the interior of the intake pipe 2 at locations intermediate between the cylinder block of the engine 1 and the throttle valve 3 and slightly upstream of respective intake valves, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is provided in communication with the interior of the intake pipe 2 at a location immediately downstream of the throttle valve 3 for supplying an electric signal indicative of the sensed absolute pressure within the intake pipe 2 to the ECU 5. An intake air temperature (TA) sensor 9 is inserted into the intake pipe 2 at a location downstream of the intake pipe absolute pressure sensor 8 for supplying an electric signal indicative of the sensed intake air temperature TA to the ECU 5.

An engine coolant temperature (TW) sensor 10, which may be formed of a thermistor or the like, is mounted in the cylinder block of the engine 1 filled with engine coolant, for supplying an electric signal indicative of the sensed engine coolant temperature TW to the ECU 5.

A cylinder-discriminating (CYL) sensor (hereinafter referred to as "the CYL sensor") 13, an engine rotational speed (NE) sensor 12, and a CRK sensor 11 are arranged in facing relation to a camshaft or a crankshaft of the engine 1, neither of which is shown. The CYL speed sensor 13 generates a pulse (hereinafter referred to as "the CYL signal pulse") at a predetermined crank angle of a particular cylinder of the engine. The engine rotational speed sensor 12 generates a pulse as a TDC signal pulse at each of predetermined crank angles corresponding to a predetermined crank angle before a top dead center (TDC) of each cylinder corresponding to the start of the intake stroke of the cylinder (whenever the crankshaft rotates through 180 degrees in the case of a four-cylinder engine), and supplies the same to the ECU 5. The CRK sensor 11 generates a pulse as a CRK signal pulse at each of predetermined crank angles whenever the crankshaft rotates through a predetermined angle (e.g. 30 degrees) with a predetermined repetition period shorter than that of TDC signal pulses, and supplies the same to the ECU 5.

Each cylinder of the engine has a spark plug 19 electrically connected via a distributor 18 to the ECU 5 to have its ignition timing controlled by a signal therefrom. Further, an automatic transmission 26, which is a well known type, is connected to the ECU 5. More specifically, the automatic transmission 26 is provided with a hydraulic pressure control circuit 26b which controls the operation of a lock-up clutch and that of a gear mechanism, neither of which is shown, and a gear position sensor 26a for detecting the gear shift position of the automatic transmission 26. The hydraulic pressure control circuit 26b and the gear position sensor 26a are electrically connected to the ECU 5.

A three-way catalyst (hereinafter referred to as "the catalytic converter") 15 is arranged within an exhaust pipe 14 connected to the cylinder block of the engine 1 for purifying noxious components of exhaust gases, such as HC, CO, and NOx. An oxygen concentration sensor (hereinafter referred to as "the O2 sensor") 16 is mounted as an air-fuel ratio sensor in the exhaust pipe 14 at a location upstream of the catalytic converter 15, respectively, for sensing the concentration of oxygen present in exhaust gases emitted from the engine 1 and supplying an electric signal indicative of the sensed oxygen concentration value thereof to the ECU 5. Further, a catalyst temperature sensor 21 is mounted at the catalytic converter 15 for detecting the temperature of the same and supplying a signal indicative of the detected catalyst temperature to the ECU 5. A vehicle speed (VP) sensor 24 is electrically connected to the ECU 5 for detecting the vehicle speed VP and supplying a signal indicative of the detected vehicle speed VP to the ECU 5.

The ECU 5 is comprised of an input circuit having the functions of shaping the waveforms of input signals from various sensors, shifting the voltage levels of sensor output signals to a predetermined level, converting analog signals from analog-output sensors to digital signals, and so forth, a central processing unit (hereinafter called "the CPU"), a memory device storing various operational programs which are executed by the CPU, and for storing results of calculations therefrom, etc., and an output circuit which outputs driving signals to the fuel injection valves 6, the distributor 18, etc.

The CPU of the ECU 5 operates in response to signals from various sensors including the above-mentioned sensors to determine various operating conditions in which the engine 1 is operating, such as an air-fuel ratio feedback control region in which the air-fuel ratio of a mixture supplied to the engine is controlled in response to the detected oxygen concentration in the exhaust gases, and air-fuel ratio open-loop control regions other than the air-fuel ratio feedback control region, and calculates, based upon the determined operating conditions, the valve opening period or fuel injection period TOUT over which the fuel injection valves 6 are to be opened, by the use of the following equation (1) in synchronism with inputting of TDC signal pulses to the ECU 5:

$$TOUT = Ti \times KO2 \times K1 + K2 \qquad (1)$$

where Ti represents a basic value of the fuel injection period TOUT, which is determined in accordance with the engine rotational speed NE and the intake pipe absolute pressure PBA. A Ti map for determining the Ti value is stored in the memory device of the ECU 5.

KO2 represents an air-fuel ratio feedback control correction coefficient whose value is determined in response to the oxygen concentration in the exhaust gases detected by the O2 sensor 16 during air-fuel ratio feedback control, and set to respective predetermined appropriate values while the engine is in the open-loop control regions.

K1 and K2 represent other correction coefficients and correction variables, respectively, which are calculated based on various engine operating parameter signals to such values as to optimize operating characteristics of the engine such as fuel consumption and driveability depending on operating conditions of the engine.

The CPU of the ECU 5 calculates ignition timing θIG based on operating conditions of the engine. The CPU supplies, through the output circuit, the fuel injection valves 6 with driving signals corresponding to the calculated fuel injection period TOUT determined as above, over which the fuel injection valves 6 are opened, and the spark plugs 19 with driving signals corresponding to the calculated θIG value.

Figure 2:
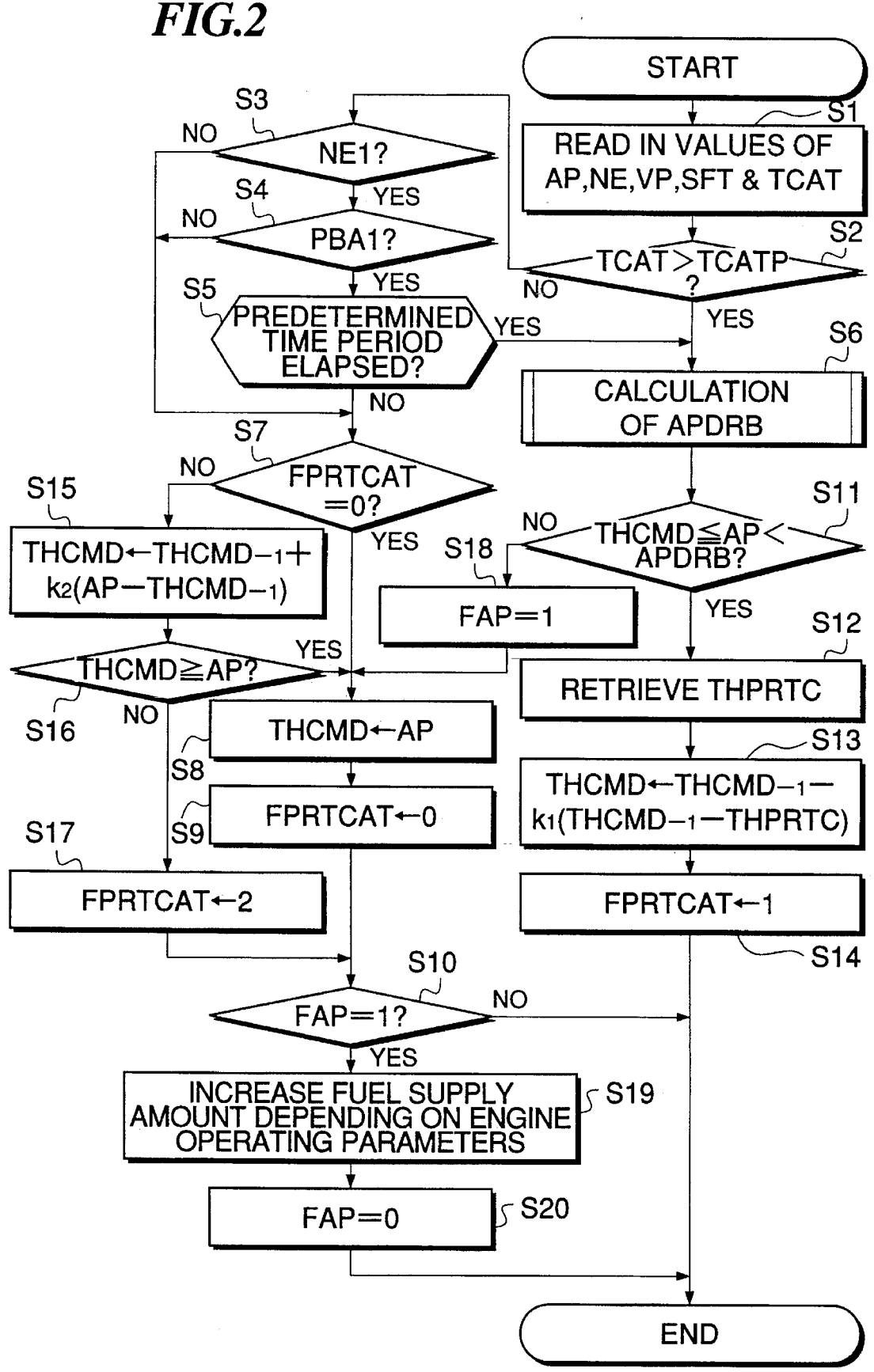
FIG. 2 is a flowchart showing an engine control routine which is executed by the control system of the first embodiment of the invention for protection of a catalytic converter of the engine.

FIG. 2 shows a routine for controlling the engine operation which is executed by the ECU 5 for protection of the catalytic converter 15. First, at a step S1, the ECU reads in values of the accelerator pedal position AP from the accelerator pedal position sensor 25, the engine rotational speed NE from the NE sensor 12, the vehicle speed VP from the vehicle speed sensor 24, the gear shift position SFT from the gear position sensor 26a, and the catalyst temperature TCAT from the catalyst temperature sensor 21.

It is then determined at a step S2 whether or not the read value of the catalyst temperature TCAT is higher than an upper limit value TCATP set for protection of the catalytic converter 15. The upper limit value TCATP is provided with a hysteresis. FIGS. 3A to 3D show changes in the catalyst temperature TCAT, the accelerator pedal position AP, the throttle valve opening TH, and a protection flag FPRTCAT, referred to hereinafter, respectively. The present engine control routine will be further described with reference to the FIG. 3 timing chart.

When the catalyst temperature TCAT is higher than the upper limit value TCATP, the program proceeds to a step S6, whereas if the catalyst temperature TCAT is not higher than the upper limit value TCATP, it is determined at a step S3 whether or not the engine rotational speed NE is higher than a predetermined value NE1, and then at a step S4 whether or not the intake pipe absolute pressure PBA is higher than a predetermined value PBA1. If the engine rotational speed NE is higher than the predetermined value NE1 and at the same time the intake pipe absolute pressure PBA is higher than the predetermined value PBA1, i.e. if the engine is in a high-speed and high-load operating condition, it is determined at a step S5 whether or not this operating condition of the engine has continued over a predetermined time period. In short, it is determined whether or not the engine is operating under a condition in which there is a high possibility that the catalyst temperature TCAT exceeds the upper limit value TCATP.

On the other hand, if it is determined at the step S3 or S4 that the engine is not in the high-speed and high-load operating condition, or at the step S5 that the high-speed and high-load operating condition of the engine has not continued over the predetermined time period, the program proceeds to a step S7.

At the step S7, it is determined whether or not the protection flag FPRTCAT assumes "0". The protection flag FPRTCAT is set to a value of 1 or 2 when catalyst-protecting engine operation control is being carried out, whereas it is reset to "0" when an ordinary engine operation control is being carried out.

Figure 3:
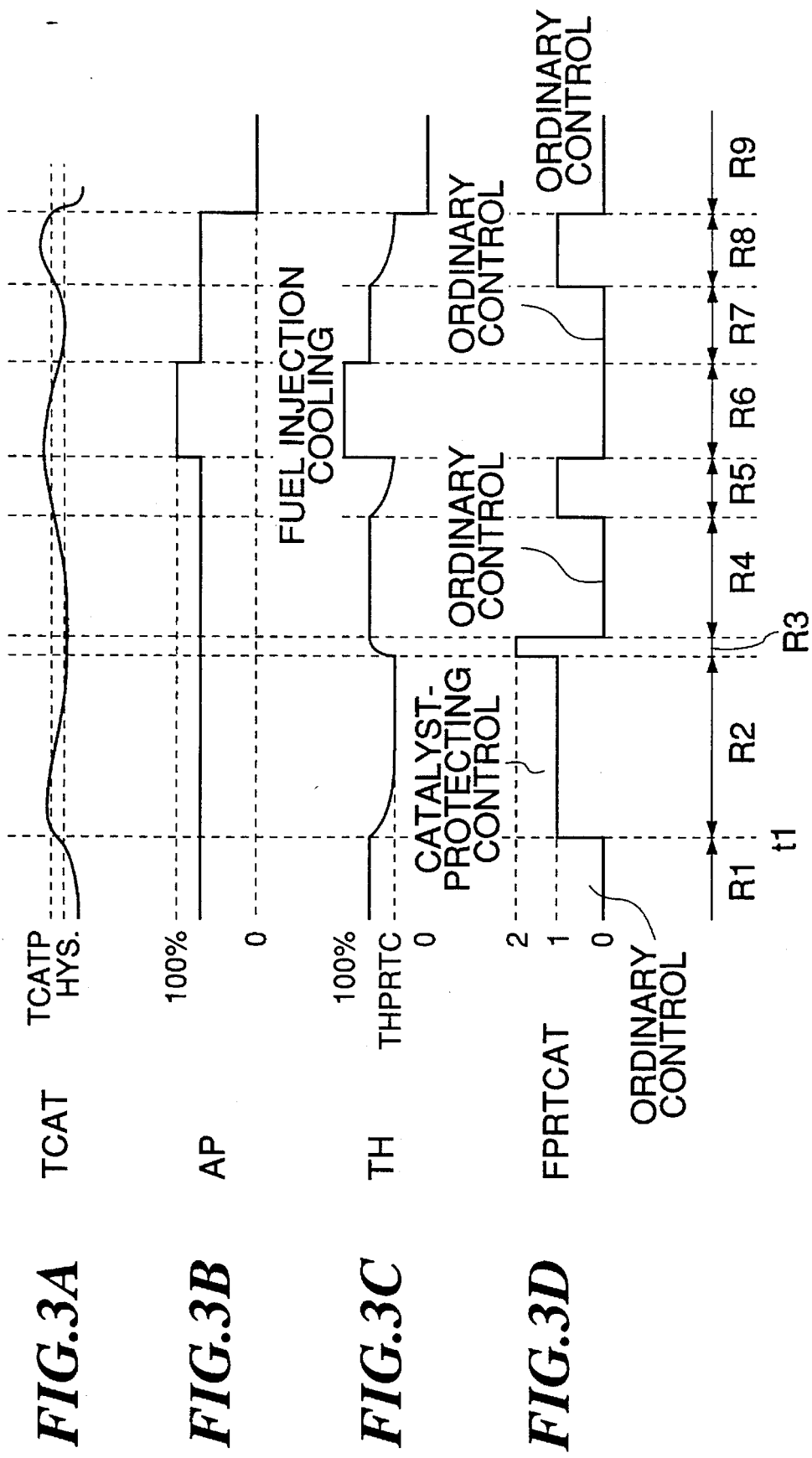

Referring to FIG. 3, when the engine is in a region indicated by R1, the protection flag FPRTCAT remains reset to "0", so that the ordinary engine operation control is carried out. More specifically, the ECU reads in a value of the accelerator pedal position AP detected by the accelerator pedal position sensor 25, and delivers a throttle valve opening command value THCMD corresponding to the value of the accelerator pedal position AP to the throttle actuator 23, thereby controlling the throttle valve 3 at a step S8.

The program then proceeds from the step S8 to a step S9, wherein the protection flag FPRTCAT is reset to "0", and it is determined at a step S10 whether or not a fuel amount-increasing control flag FAP assumes "1". The fuel amount-increasing control flag FAP is set to a value of "1" for execution of the fuel injection cooling at a step S18 to carry out fuel amount-increasing control, as will be described hereinafter, while when the fuel amount-increasing control is not to be carried out, it is reset to "0". Accordingly, in the present loop, the fuel amount-increasing control flag assumes "0", so that the program is immediately terminated.

When the catalyst temperature TCAT becomes higher than the upper limit value TCATP (at a time point t1 in FIG. 3), or the engine has continued to be in the high-speed and high-load operating condition over the predetermined time period (as determined at the steps S3 to S5), a driveability-preferred accelerator pedal position APDRB is calculated at a step S6 for carrying out the engine operation control with higher priority given to the driveability of the vehicle.

Figure 4:
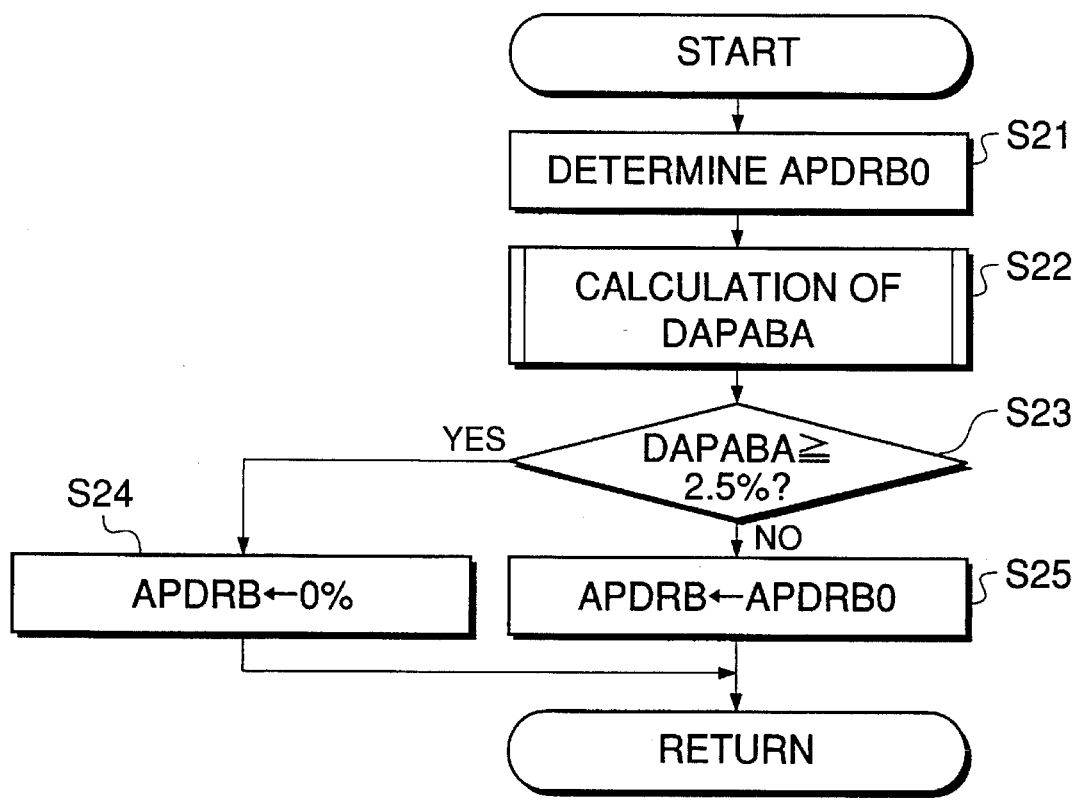
FIG. 4 is a flowchart showing a routine for calculating the accelerator pedal position AP.
Figure 6B:
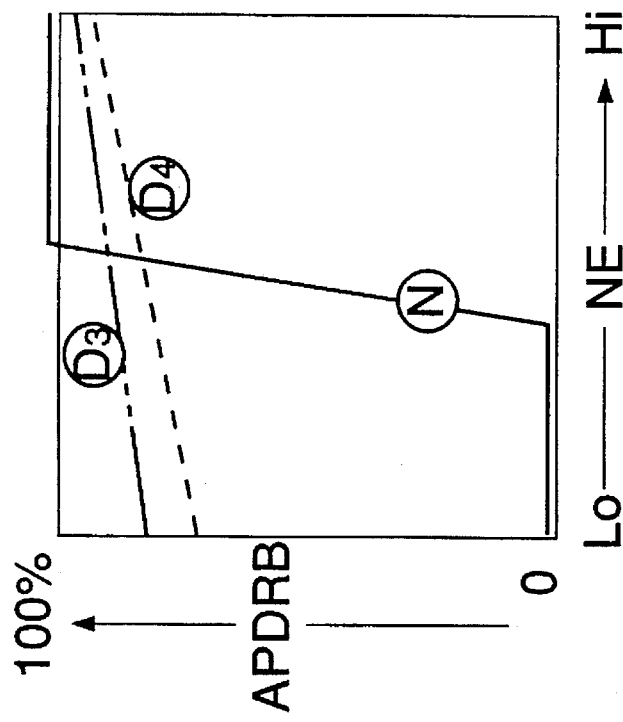
FIG. 6B shows a table for an engine with an automatic transmission for use in calculating a driveability-preferred accelerator pedal position APDRB according to the engine rotational speed NE.
Figure 6A:
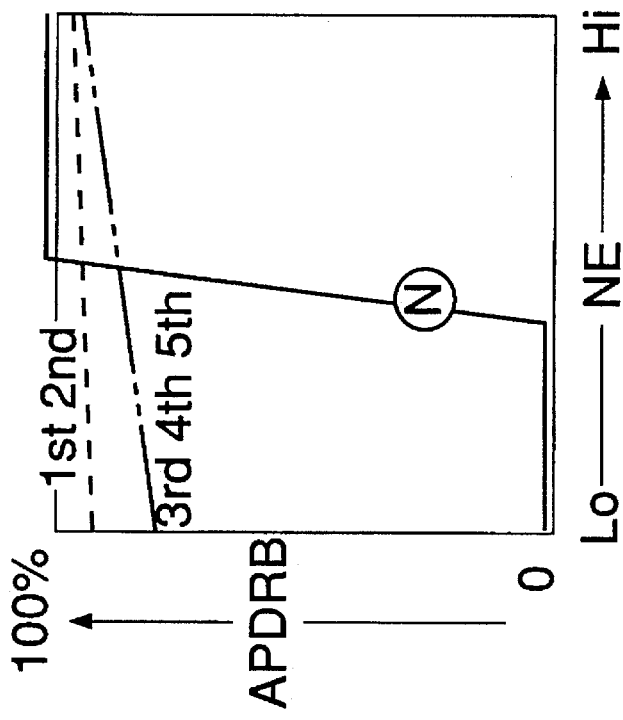
FIG. 6A shows a table for an engine with a manual transmission for use in calculating a driveability-preferred accelerator pedal position APDRB according to engine rotational speed NE.

FIG. 4 shows a routine for calculating the driveability-preferred accelerator pedal position APDRB. FIGS. 6A and 6B show tables of the driveability-preferred accelerator pedal position APDRB. The table of FIG. 6A is applied to an engine equipped with a manual transmission, while the table of FIG. 6B is applied to an engine equipped with an automatic transmission.

The driveability-preferred accelerator pedal position APDRB is determined by retrieving a corresponding one of the FIGS. 6A and 6B tables according to the engine rotational speed NE, and the determined value is set to a basic value APDRB0.

Figure 5:
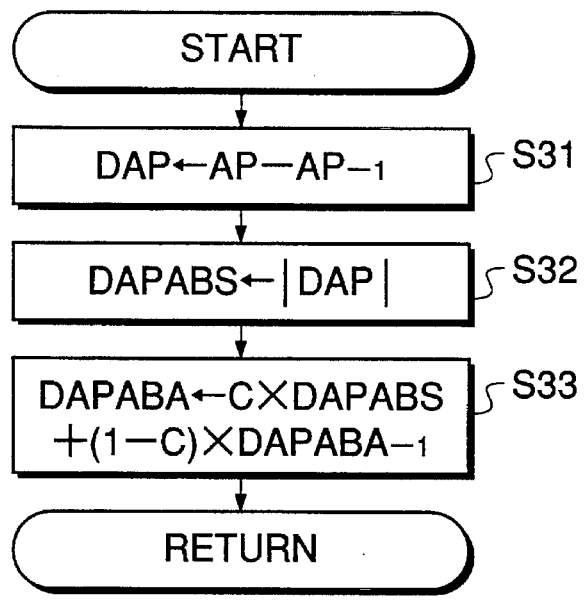
FIG. 5 is a flowchart showing a routine for calculating an amount of change DAPABA in the accelerator pedal position AP.

Then, an amount of change DAPABA in the accelerator pedal position AP is calculated at a step S22. FIG. 5 shows a routine for calculating the amount of change DAPABA in the accelerator pedal position AP. This routine is carried out at predetermined regular time intervals of a predetermined time period (e.g. 0.1 seconds).

First, a difference DAP between the present value AP of the accelerator pedal position and the immediately preceding value AP−1 of the same, i.e. an amount of change DAP over the predetermined time interval (0.1 seconds) is calculated at a step S31. Then, the absolute value DAPABS of the difference DAP is calculated at a step S32. At a step S33, an average value DAPABA of the amount of change DAP in the accelerator pedal position AP (hereinafter referred to as "the averaged amount of change DAPABA") is calculated by the use of the following equation (2), followed by terminating the routine.

$$DAPABA = C \times DAPABS + (1-C) \times DAPAB-1 \quad (2)$$

where C represents an averaging coefficient, and DAPAB−1 represents the immediately preceding value of the averaged amount of change DAPABA.

Referring again to FIG. 4, after the calculation of the averaged amount of change DAPABA at the step S22, it is determined at a step S23 whether or not the averaged amount of change DAPABA is larger than a predetermined value (e.g. 2.5%). If the averaged amount of change DAPABA exceeds the predetermined value, i.e. if the accelerator pedal position AP changes largely, the driveability-preferred accelerator pedal position APDRB is set to a predetermined value (e.g. 0%) at a step S24 higher priority given to the derivability of the vehicle, followed by terminating the routine.

On the other hand, if the averaged amount of change DAPABA of the accelerator pedal position AP is smaller than the predetermined value, the driveability-preferred accelerator pedal position APDRB is set to the basic value APDRB0 at a step S25, followed by terminating the routine.

Figure 7:
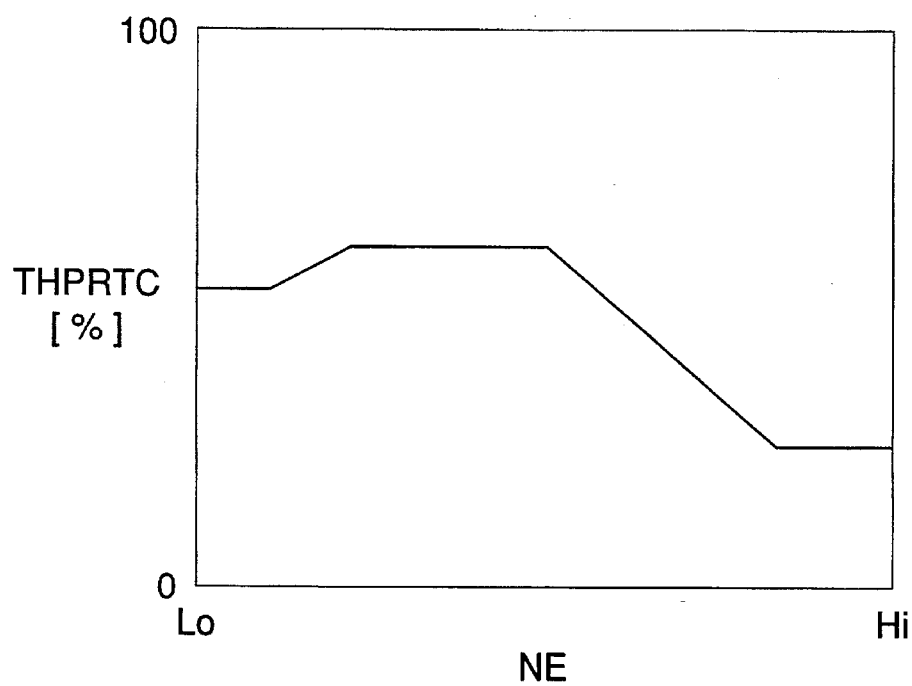
FIG. 7 shows a table for use in calculating a catalyst-protective throttle valve opening THPRTC according to the engine rotational speed NE.

When the driveability-preferred accelerator pedal position APDRB is set at the step S6, it is determined at a step S11 whether or not the present value of the accelerator pedal position AP is smaller than the driveability-preferred accelerator pedal position APDRB set as above and equal to or larger than a value corresponding to the throttle valve opening command value THCMD (indicated as "THCMD≦AP<APDRB" in FIG. 2). If THCMD≦AP<APDRB is fulfilled, a catalyst-protecting throttle valve opening THPRTC for a substantially constant speed traveling condition of the vehicle is determined by retrieving a THPRTC table according to the engine rotational speed NE at a step S12. FIG. 7 shows the THPRTC table in which values of the catalyst-protecting throttle valve opening THPRTC are provided in a manner corresponding to values of the engine rotational speed NE.

The throttle valve opening command value THCMD is set by the use of the following equation (3) by applying the catalyst-protecting throttle valve opening THPRTC value to the equation at a step S13, whereby the throttle valve opening command value THCMD is stepwise decreased to progressively decrease the opening of the throttle valve 3:

$$THCMD = THCMD-1-k2 \ (THCMD-1-THPRTC) \quad (3)$$

where k2 represents an averaging coefficient which is a positive value equal to or smaller than 1, and THCMD−1 represents the immediately preceding value of the throttle valve opening command value THCMD.

Then, the protection flag FPRTCAT is set to a value of "1" at a step S14, followed by terminating the program.

This processing of gradually decreasing the throttle valve opening TH is carried out in a region R2 indicated in FIG. 3.

On the other hand, if the protection flag FPRTCAT does not assume "0" at the step S7, i.e. if it assumes "1" or "2", which means that the engine has already been being controlled for protection of the catalytic converter 15, the throttle valve opening command value THCMD is progressively restored to a value corresponding to the accelerator pedal position AP demanded by the driver of the vehicle at a step S15 by the use of the following equation (4):

$$THCMD = THCMD-1+k1 \ (AP-THCMD-1) \quad (4)$$

where k1 represents an averaging coefficient which is a positive value equal to or smaller than 1.

Next, it is determined at a step S16 whether or not the throttle valve command opening value THCMD is equal to or larger than a corresponding value of the accelerator pedal position AP. If the throttle valve opening command value THCMD is equal to or larger than the corresponding value of the accelerator pedal position AP, the program proceeds to the step S8, followed by executing the ordinary engine control described above.

On the other hand, if the throttle valve opening command value THCMD is smaller than the corresponding value of the accelerator pedal position AP, the protection flag FPRTCAT is set to "2" at a step S17, followed by the program proceeding to the step S10. The above processing of progressively shifting the engine operation control from the catalyst-protecting engine operation control to the ordinary engine operation control is carried out in a region R3 in FIG. 3.

Next, let it be assumed that the driver has stepped on the accelerator pedal, thereby demanding a sudden acceleration of the engine (in a region R6 in FIG. 3) when the catalyst temperature TCAT is so high that the catalyst-protecting engine operation control is being carried out (in a region R5 in FIG. 3).

In such a case, the condition of THCMD≦AP<APDRB is not fulfilled at the step S11. For example, if the driveability-preferred accelerator pedal position corresponds to 80% of the maximum or full throttle valve opening, the actual accelerator pedal position corresponds to 90% of the maximum or full throttle valve opening, and the throttle valve opening command value THCMD-1 is 50% of the maximum or full throttle valve opening, the above condition is not fulfilled. Accordingly, the fuel-amount increasing control flag FAP is set to "1" at a step S18, thereby shifting the engine operation control to the ordinary engine operation control, and then the program proceeds to the step S8, to set the throttle valve opening command value THCMD to a value corresponding to the accelerator pedal position AP demanded by the driver.

Then, the answer to the question of the step S10 becomes affirmative (YES), so that the program proceeds to a step S19, wherein the fuel amount-increasing control is carried out depending on engine operating parameters and the catalyst temperature TCAT. The fuel amount-increasing control is well known, and hence detailed description thereof is omitted. Then, the fuel-amount increasing control flag FAP is reset to "0" at a step S20, followed by terminating the program. The above processing of lowering the catalyst temperature TCAT by so-called fuel injection cooling is carried out e.g. in the region R6 in FIG. 3. When the catalyst temperature TCAT is subsequently lowered by fuel injection cooling, the ordinary engine operation control is resumed (in a region R7 in FIG. 3).

Thereafter, when the engine continues to be in the high-speed and high-load operating condition over the predetermined time period or the catalyst temperature TCAT exceeds the upper limit value TCAT, the throttle valve 3 is progressively closed as described hereinbefore (in a region R8 in FIG. 3), and immediately when the catalyst temperature TCAT becomes sufficiently low, the throttle valve opening command value THCMD is set to the accelerator pedal position AP at the step S8, thereby resuming the ordinary engine operation control (in a region R9 in FIG. 3).

As described above, according to the present embodiment, when the catalyst temperature TCAT becomes higher than the upper limit value TCATP, or when the engine continues to be in a high-speed and high-load condition over a predetermined time period, the throttle valve opening TH is progressively decreased to lower the catalyst temperature TCAT when the vehicle is traveling at a substantially constant traveling speed, but the fuel injection cooling is carried out when the driver demands a sudden acceleration. This makes it possible to secure required driveability and at the same time restrain an abnormal rise in the temperature of the catalytic converter 15 to prevent deterioration thereof, while preventing an increase in the emission amount of noxious components of exhaust gases as well as an increase in the fuel consumption.

The control system of the present embodiment may be applied to automotive vehicles of an automatic transmission type as well as ones of a manual transmission type. Further, the temperature of the catalytic converter 15 may be directly detected by an exclusive sensor as in the present embodiment, and alternatively, it may be presumed from engine operating parameters, such as the intake pipe absolute pressure PBA and the engine rotational speed NE.

Further, although in the present embodiment the fuel amount-increasing control is carried out when the fuel amount-increasing control flag FAP assumes "1", this is not limitative, but the amount of fuel supply may be increased to effect the fuel injection cooling when the condition of THCMD≦AP<APDRB is fulfilled even if it is determined at the step S2 that the catalyst temperature TCAT is equal to or lower than the upper limit value TCATP.

Next, a second embodiment of the invention will be described. This embodiment is applicable solely to automotive vehicles of the automatic transmission type.

Figure 8:
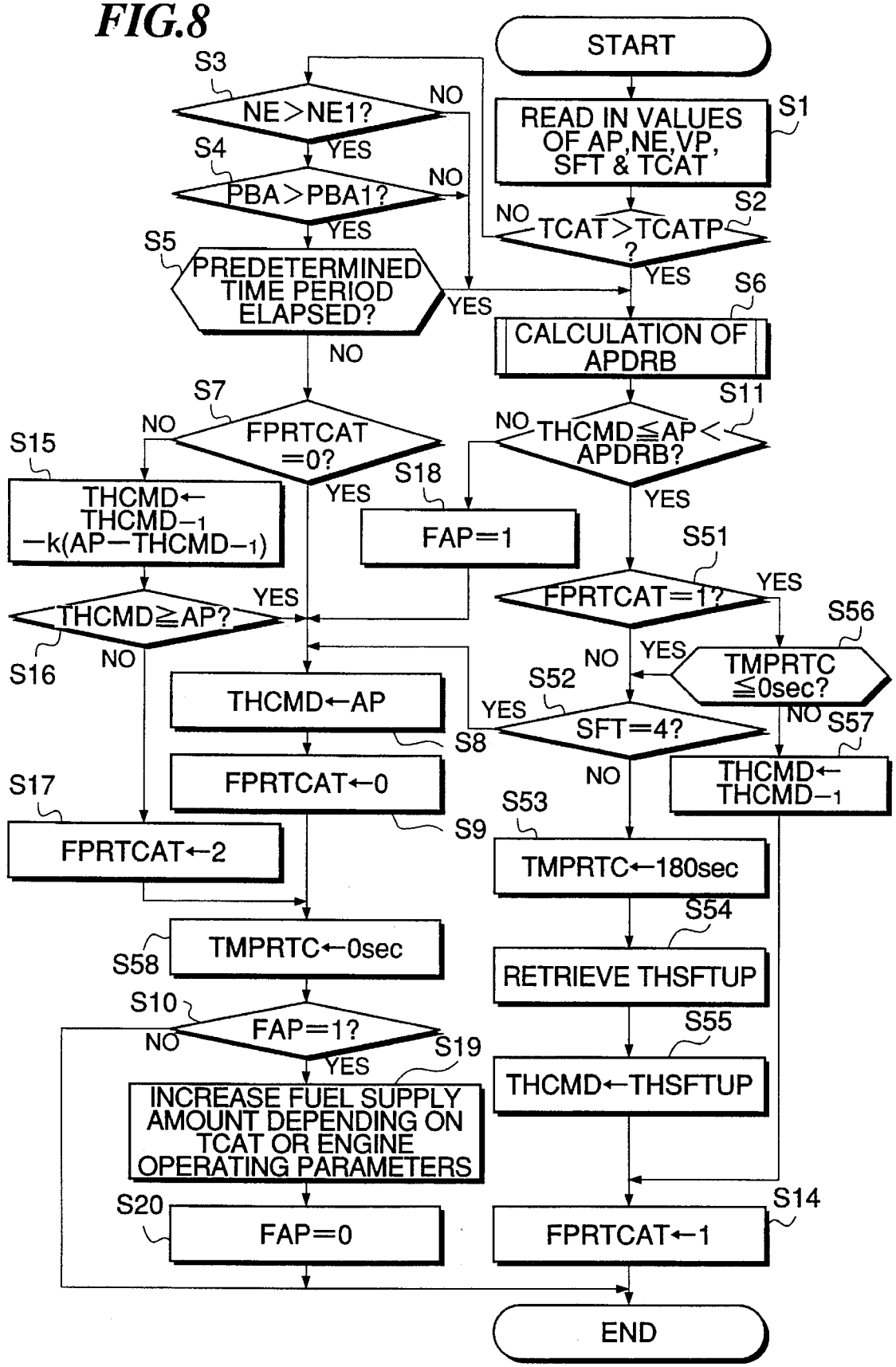
FIG. 8 is a flowchart showing an engine control routine executed by a second embodiment of the invention.

The mechanical arrangement of the control system of this embodiment is identical to that of the first embodiment, while FIG. 8 shows an engine operation control routine executed by the control system of this embodiment. Corresponding steps to those of FIG. 2 of the first embodiment are designated by the same reference numerals, and detailed description thereof is omitted.

In the second embodiment, to suppress an abnormal rise in the catalyst temperature TCAT, the gear shift position SFT of the automatic transmission 2 is changed to a higher speed position to decrease the reduction gear ratio, and at the same time control the throttle valve opening command value THCMD in a closing direction.

More specifically, at a step S11, it is determined whether or not the present value of the accelerator pedal position AP is smaller than the driveability-preferred accelerator pedal position APDRB, and at the same time equal to or larger than a value corresponding to the throttle valve opening THCMD. If the condition of THCMD≦AP<APDRB is fulfilled, the catalyst-protecting engine operation control is executed for a substantially constant traveling speed condition of the vehicle. FIG. 9A to FIG. 9F show changes in the catalyst temperature TCAT, the accelerator pedal position AP, the throttle valve opening TH, the gear shift position SFT, the protection flag FPRTCAT, and the count TMRTC of a shift-up inhibiting timer, referred to hereinafter, respectively. The FIG. 8 routine will further be described with reference to the FIG. 9 timing chart.

Figure 10:
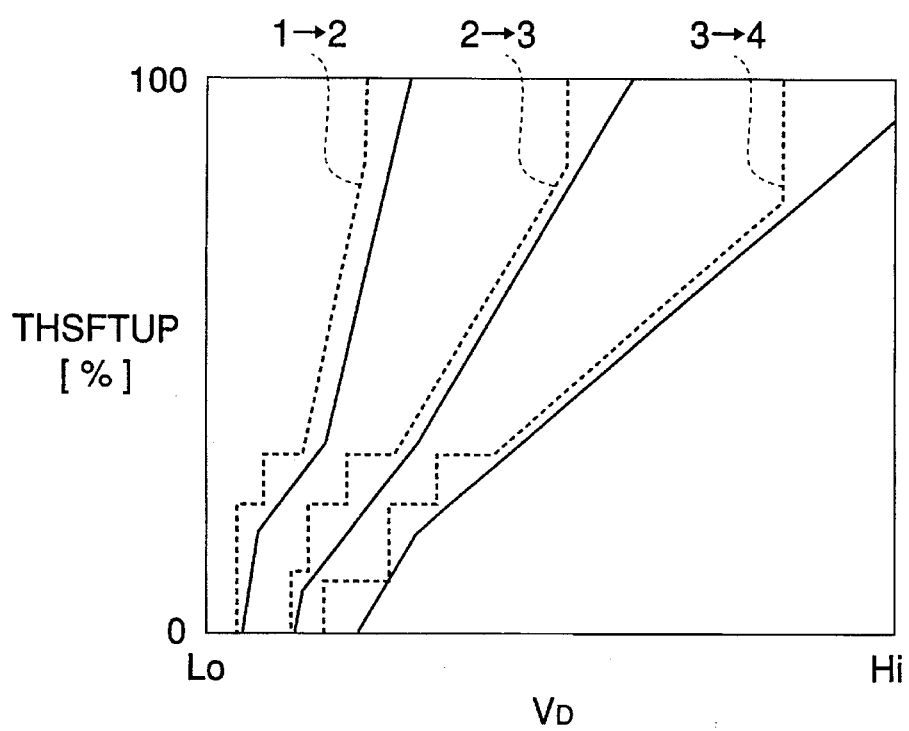
FIG. 10 shows a table for use in calculating a throttle valve opening THSFTUP applied according to vehicle speed VP upon shifting-up of the transmission.

At a step S51, it is determined whether or not the protection flag FPRTCAT assumes "1". Before the catalyst-protecting engine control is started, the protection flag FPRTCAT assumes "0" or "2", and hence the engine operation control for protection of the catalyst is started by shifting up the gear shift position SFT to reduce the reduction gear ratio. To shift up the gear shift position SFT, it is determined at a step S52 whether or not the gear shift position SFT is a highest speed or top gear position (e.g. 4th speed position). If the shift position SFT is not the highest speed position, the gear shift position is shifted up to decrease the reduction gear ratio (at a time point t11 in FIG. 9). More specifically, the count of the shift-up inhibiting timer is set to a predetermined time period, e.g. 180 sec. at a step S53, and a shifting-up throttle valve opening THSFTUP to be applied when the gear of the automatic transmission is to be shifted up is determined by retrieving a THSFTUP table at a step S54. FIG. 10 shows the THSFTUP table in which values of the throttle valve opening THSFTUP are provided in a manner corresponding to values of the vehicle speed VP.

The thus determined value of the shifting-up throttle valve opening THSFTUP is set to the throttle valve opening command value THCMD at a step S55, and then the protection flag FPRTCAT is set to a value of 1 at a step S14, followed by terminating the program. This processing is effected at a time point t11 indicated in FIG. 9, and the CPU of the ECU 5 of the engine carries out shifting-up of the gear shift position SFT (from the second speed position to the third speed position in the illustrated example) simultaneously when the throttle valve opening command value THCMD is set to the shifting-up throttle valve opening THSFTUP at the step S55.

When the present routine is again carried out in the next loop, the answer to the question of the step S51 becomes affirmative (YES), i.e. the protection flag FPRTCAT assumes "1", so that the program proceeds to a step S56, wherein it is determined whether or not the count TMPRTC of the shift-up inhibiting timer becomes equal to or less than a value of 0. If the count TMPRTC of the shift-up inhibiting timer does not reach the value of 0, the program proceeds to a step S57, wherein the immediately preceding value of the throttle valve opening THCMD is set to the preset value thereof, thereby inhibiting the shifting-up of the gear shift position (in a region R12 in FIG. 9).

When the count TMPRTC of the shift-up inhibiting timer becomes equal to or less than the value of 0, the program proceeds to the step S52, wherein the gear shift position SFT of the automatic transmission 26 is shifted up, in the same manner as described above. A time point t12 indicates timing of changing over the gear shift position SFT from the third speed position to the fourth speed position.

According to the catalyst-protecting engine operation control described above, when the catalyst temperature TCAT becomes lower than the upper limit TCAT, and at the same time the engine is not in the high-speed and high-load condition, or this condition has not continued over the predetermined time period (as indicated by a region R14 in FIG. 9), the processing of the steps S7, S15, and S16 is carried out, and accordingly the CPU of the ECU 5 carries out shifting-down of the gear shift position SFT of the automatic transmission 26 to increase the reduction gear ratio. By this shift-down processing, the engine operation control is shifted from the catalyst-protecting engine operation control to the ordinary engine operation control is carried out. Then at the following step S17, the protection flag FPRTCAT is set to the value of 2, and the shift-up inhibiting timer is reset to a value of 0 at a step S58. Before the answer to the question of the step S16 becomes affirmative (YES), i.e. the throttle valve opening command value THCMD becomes equal to or higher than a value corresponding to the accelerator pedal position AP, the shift-down processing is carried out in which the gear of the automatic transmission is shifted down to increase the reduction gear ratio. In the region R14 of FIG. 9, the gear shift position SFT is shifted down from the fourth speed position to the second speed position. When the throttle valve opening command value THCMD becomes equal to or higher than a value corresponding to the accelerator pedal position AP, the ordinary engine operation control is resumed. The fuel amount-increasing control of the step S19 is identical to that effected in the first embodiment of the invention.

What is claimed is:

1. A control system for an internal combustion engine for an automotive vehicle, said engine having an intake system, intake air amount-regulating means associated with said intake system for regulating an amount of intake air to be supplied to said engine, an exhaust system, and a catalytic converter arranged in said exhaust system, said control system comprising:

temperature-determining means for determining whether said catalytic converter is in a predetermined high temperature condition;

intake air amount control means for controlling said intake air amount-regulating means to decrease said amount of intake air when it is determined by said temperature-determining means that said catalytic converter is in said predetermined high temperature condition;

fuel amount-increasing means for increasing an amount of fuel to be supplied to said engine when it is determined by said temperature-determining means that said catalytic converter is in said predetermined high temperature condition; and priority-determining means for giving priority to one of said intake air amount control means and said fuel amount-increasing means, depending on operating conditions of said engine.

2. A control system according to claim 1, wherein said automotive vehicle has an accelerator pedal, said intake air amount-regulating means comprising a throttle valve, said engine having electric driving means for electrically driving said throttle valve in response to a position of said accelerator pedal, said intake air amount control means comprising throttle valve control means for controlling said electric driving means to decrease an opening of said throttle valve when it is determined that said catalytic converter is in said predetermined high temperature condition.

3. A control system according to claim 1, wherein said automotive vehicle includes an automatic transmission, said control system including transmission control means for reducing a reduction gear ratio of said automatic transmission when said intake air amount control means controls said intake air amount-regulating means to decrease said amount of intake air.

4. A control system according to claim 2, wherein said automotive vehicle includes an automatic transmission, said control system including transmission control means for reducing a reduction gear ratio of said automatic transmission when said throttle valve control means controls said electric driving means to decrease said opening of said throttle valve.

5. A control system according to any of claims 1 to 4, wherein said temperature-determining means detects temperature of said catalytic converter and determines that said catalytic converter is in said predetermined high temperature condition when the detected temperature of said catalytic temperature is higher than a predetermined value.

6. A control system according to any of claims 1 to 4, wherein said temperature-determining means determines that said catalytic converter is in said predetermined high temperature condition when said engine has continued to be in an operating condition in which rotational speed of said engine exceeds a predetermined value and at the same time load on said engine exceeds a predetermined value, over a predetermined time period.

7. A control system according to any of claims 1 to 4, wherein said priority-determining means gives priority to said fuel amount-increasing means over said intake air amount control means when said engine is in a predetermined accelerating condition.

8. A control system according to claims 2 or 4, wherein said priority-determining means gives priority to said fuel amount-increasing means over said throttle valve control means when a stepping amount of said accelerator pedal is larger than a predetermined amount.

9. A control system according to claim 8, wherein said priority-determining means gives priority to said fuel amount-increasing means over said throttle valve control means when an amount of change in said stepping amount of said accelerator pedal is larger than a predetermined value and at the same time said stepping amount of said accelerator pedal is larger than said predetermined amount.

10. A control system according to claim 2, wherein said throttle valve control means controls said electric driving means to progressively decrease said opening of said throttle valve when it is determined that said catalytic converter is in said predetermined high temperature condition.

11. A control system according to claim 10, wherein said throttle valve control means controls said electric driving means to progressively decrease said opening of said throttle valve at a rate dependent on rotational speed of said engine.

12. A control system according to claim 4, wherein said transmission control means includes inhibiting means for inhibiting said transmission control means from further reducing said reduction gear ratio of said automatic transmission, over a predetermined time period after said transmission control means reduced said reduction gear ratio of said automatic transmission.

13. A control system according to claim 4, wherein said transmission control means reduces said reduction gear ratio of said automatic transmission by setting a desired opening of said throttle valve according to traveling speed of said automotive vehicle.

14. A control systems according to claim 2 or 10, wherein said throttle valve control means controls said throttle valve such that said opening of said throttle valve is progressively increased to a value corresponding to a stepping amount of said accelerator pedal, when it is determined that said catalytic converter is no longer in said predetermined high temperature condition after said throttle valve opening has been reduced.

* * * * *